United States Patent [19]

Wertheim et al.

[11] 4,324,808
[45] Apr. 13, 1982

[54] PROCESS FOR PREPARING FREEZE DRIED SOLUBLE COFFEE

[75] Inventors: John H. Wertheim; Abraham R. Mishkin, both of Marysville, Ohio

[73] Assignee: Societe d'Assistance Technique pour Produits Nestle S.A., Lausanne, Switzerland

[21] Appl. No.: 79,056

[22] Filed: Sep. 26, 1979

Related U.S. Application Data

[63] Continuation of Ser. No. 537,679, Mar. 28, 1966.

[30] Foreign Application Priority Data

Apr. 2, 1965 [CH] Switzerland .......................... 4606/65

[51] Int. Cl.³ ............................ A23F 5/32; A23F 5/38
[52] U.S. Cl. ........................................ 426/385; 34/5; 426/470
[58] Field of Search ....................... 426/385, 470; 34/5

[56] References Cited

U.S. PATENT DOCUMENTS

| | | | |
|---|---|---|---|
| 2,974,497 | 3/1961 | Carpenter et al. | 426/524 X |
| 3,253,420 | 5/1966 | DeGeorge | 426/524 X |
| 3,482,990 | 12/1969 | Pfluger et al. | 426/385 |

FOREIGN PATENT DOCUMENTS 948517  2/1964  United Kingdom .

OTHER PUBLICATIONS

Sivetz et al., "Coffee Processing Technology, vol. I, 1963, Pub. by *The Avi Publishing Co., Ink.* Westport, Conn. pp. 506–509.

Flosdorf, "Freeze-Drying", 1949, Published by the *Reinhold Pub. Corp.*, N.Y. pp. 128–129.

*Primary Examiner*—Joseph M. Golian
*Attorney, Agent, or Firm*—Vogt & O'Donnell

[57] ABSTRACT

Freeze dried soluble coffee having a density of about 0.2 to 0.3 gm/cc is prepared from concentrated coffee extract by foaming the extract with inert gas, freezing the foam and freeze drying the particulated frozen foam. Other features of the invention appear in the following specification.

2 Claims, No Drawings

PROCESS FOR PREPARING FREEZE DRIED SOLUBLE COFFEE

This is a continuation of application Ser. No. 537,679, filed Mar. 28, 1966.

The present invention is concerned with the production of extracts from vegetable materials, notably coffee.

Various processes for the production of soluble powdered extracts from coffee infusions are known. A typical process might comprise the steps of extraction of roast and ground coffee with water, concentration of the extract and drying, usually in a spray drying apparatus of suitable construction. Manufacturers of coffee extracts have continued their researches to cevelop a process whereby the resulting coffee extract, upon reconstitution with water, resembles as closely as possible a freshly brewed infusion of roast and ground coffee.

The present invention provides a process for the production of a powdered coffee extract in which an inert gas is added to a concentrated aqueous coffee extract to provide a foam, the foam is frozen to a solid state and the frozen solid foam is freeze-dried.

After freeze-drying, the coffee extract is obtained in the form of a powder the density of which is usually 0.2 to 0.3 gm/cc.

According to one embodiment of the invention, the solid frozen foam, before being freeze-dried, is comminuted to a particle size corresponding approximately to that of roast and ground coffee. The powdered coffee extract prepared according to the present invention may be aromatised as desired, for example by the method disclosed in U.S. Pat. No. 3,148,070.

The concentrated aqueous coffee extract used as starting material in the process according to the present invention may be prepared by any desired extraction technique. For example, the aqueous extract may be prepared by counter-current percolator extraction of coffee using a battery of 8 cells, of which 6 are used in the extraction cycle, the seventh, containing spent coffee, is being emptied and filled with fresh coffee and the eighth contains fresh coffee from which the volatile coffee aromatics are being stripped. During a typical extraction cycle, water at about 150°–170° C. is introduced under pressure into the first cell, which contains coffee which has already been extracted, and passes through each of the cells, which are connected in series. The extract is drawn off from the last cell, containing fresh coffee, where the extraction temperature is about 100° C. The extract which is drawn off is weighed continuously and the cycle is terminated when the desired quantity of extract has been obtained.

The extract, containing 10 to 20% by weight of soluble coffee solids, is then concentrated by any suitable means, for example by evaporation or freezing, until a concentration of 25 to 60% solid matter is reached. When the concentration is effected by evaporation, it may be preferable first to strip the volatile aromatics from the dilute extract. The aromatics thus recovered may optionally be combined with all or a part of the aromatics stripped from the ground coffee before extraction and may then be added to the concentrated extract before drying or be plated onto the powdered extract.

Drying of the concentrated extract should desirably be carried out under controlled conditions such that the finished product possesses an appropriate density and colour. The first step of the drying process consists, as indicated above, of incorporating an inert gas in the concentrated extract so as to produce a foam the density of which preferably lies between 0.4 and 0.8 gm/cc. A foam having a density within this range may be prepared by cooling the extract to about 0° C. or below, using a suitable heat exchanger and then blowing in the inert gas. The foam may then be passed through a mixer so that it might be quite homogeneous. Carbon dioxide and nitrous oxide are the preferred inert gases which may be used singly or in combination. Nitrogen may also be employed in the production of the foam.

The foamed coffee extract is frozen to a solid mass, for example on a cooled metal belt on which it is preferably spread at a layer thickness of 10 to 40 mm. The conditions of freezing, notably belt speed, freezing temperature, thickness of foam layer as well as the density of the foam, are factors which have an important influence on the colour of the finished product and should therefore be carefully controlled. Preferably, cooling is effected in two stages, for example on a belt which comprises two sections which are at different temperatures. Thus, the first section of the belt may be cooled to a temperature of $-12°$ to $-29°$ C. whilst the second section may be at a lower temperature, for example between $-40°$ and $-70°$ C. In general, it is desirable for the residence time of the foam on the cooling belt to be not less than about 7 minutes, and may be as long as 25 minutes. In this manner a dried product having a pleasant dark colour may be obtained.

At the end of the belt the extract is removed as a continuous rigid sheet which may then be broken up into fragments suitable for grinding. These fragments may, for example, be ground to a particle size which is preferably within the range 0.25 to 2.0 mm.

The ground particles are then freeze-dried in conventional cabinets, on trays which are loaded to a layer thickness of, for example, 25 mm. The sublimation of the ice crystals is effected under a high vacuum, of about 150 to 175 microns, and generally lasts around 7 hours. Thereafter, the product may be packed as desired.

In a modification of the process, the frozen extract may be freeze-dried in the form of plates or lumps which are subsequently ground to the desired particle size. This method, however, might have the disadvantage of producing an increased quantity of very fine particles which could lead to difficulties during filling.

In a further modification, the density of the final product may be adjusted after drying. In this procedure the liquid extract is transformed into a relatively dense foam (density above 0.6 gm/cc) which is frozen and ground to a fine particle size, of the order of 0.1 to 0.5 mm. These fine particles are then freeze-dried and agglomerated. A highly coloured product of regular particle size is thus obtained.

The freeze-dried coffee extract, if desired in agglomerated condition, may be aromatised, before filling, for example by the process described in U.S. Pat. No. 3,148,070. This aromatisation method involves the incorporation in or plating onto the coffee particles of an aroma condensate obtained from roast and ground coffee. Preferably, this condensate is added in an amount corresponding to 0.1 to 0.5% by weight of the powdered coffee product. It is convenient to mix the condensate with an oily carrier, especially coffee oil, the quantity of carrier generally being approximately equal to or slightly greater than the quantity of condensate.

The present invention also provides an apparatus suitable for carrying out the process described herein. The apparatus according to the invention comprises, in combination, a closed chamber capable of being maintained at a temperature substantially below the melting point of the coffee extract, a movable endless belt disposed within said chamber, means for moving the belt at a low speed, a spreading device for distributing coffee extract foam on said belt and refrigerating means for cooling at least one surface of said belt by means of a liquid refrigerant. Desirably, the belt comprises two sections which are adapted to be cooled to different temperatures. Each of these sections may be provided with separate cooling means, for example sprinklers for spraying the refrigerant against the underside of the belt. The refrigerant cooling the first section may, for example, be an ethylene glycol solution, at a temperature of $-12°$ to $-29°$ C., whereas the second section may be cooled to a temperature of $-40°$ to $-70°$ C. The refrigerants are themselves cooled by a suitable cooling installation.

The apparatus also comprises driving means, such as an electric motor with suitable reduction gearing, for moving the belt at a slow speed. Generally for a belt having an available length of 15 to 25 m a speed of 0.5 to 1.5 m/min. is quite satisfactory.

At the end of its run the belt, which is preferably made of metal, may be extended by a second belt or table onto which the sheet of frozen product is fed, whence it passes to a fragmenter and mill or grinder. The fragmenter may for example be a conventional vegetable cutter. The broken frozen fragments may then be passed to a mill where they are ground to an average particle size of 0.2 to 2 mm. The ground particles are then screened and loaded onto trays which are placed in freeze-drying chambers.

As indicated, the apparatus according to the invention includes a chamber wherein there is maintained a temperature which is below the melting point of the frozen extract. It has been found that chamber temperatures of the order of $-25°$ to $-45°$ C. are satisfactory.

The powdered coffee extract prepared according to the present invention has the appearance of roast and ground coffee and contains a high proportion of coffee aromatics, as is shown in the Examples.

The following Examples are given only for the purpose of illustrating the invention.

EXAMPLE 1

A coffee extract is prepared by water extraction of roast and ground coffee in a percolator bank of 8 cells, each being 35 cm in diameter and 122 cm long. Each cell contains about 40 kg of ground roast coffee, the grind being slightly coarser than that generally used in the industrial preparation of coffee infusions by percolation. The fresh coffee in the first cell is stripped with steam to yield 815 gm of aromatic condensate. The extraction cycle is carried out with 6 cells, beginning with that which contains coffee which has already been extracted. 164 kg of extract are drawn from the sixth cell, which contains fresh coffee. The extraction water enters the first cell at about 170° and the extract passing through the last cell is at a temperature of about 95° C.

The aqueous extract is stripped counter-current to steam in a suitable column, the quantity of steam used representing about 3% by weight of the extract. The vapours are condensed and cooled to 5° C. The extract is then concentrated to about 50% total solids in a suitable evaporator, preferably a climbing film double-effect evaporator. Thereafter at least a portion of the aromatics obtained by stripping fresh coffee and stripping of the dilute extract are added to the concentrated liquor.

The aromatised extract is then cooled to 0° C. in a suitable heat exchanger and is mixed with the inert gas, which is carbon dioxide. 115 ml of gas (at a pressure of 10.5 kg/cm$^2$) are added per kilogram of cooled extract and the gas is dispersed by means of a suitable mixer so as to obtain a stable, homogeneous foam having a density of about 450 gm/liter. This foam is spread at a layer thickness of 12 mm on an endless metal belt the first section of which is cooled by spraying aqueous ethylene glycol at about $-29°$ C. on its underside. In this manner the product is frozen relatively slowly. After the first cooling, the product is deep-frozen on the second section of the belt where it is cooled to about $-45°$ C. for approximately 15 minutes. The product is removed at the end of the belt as a rigid sheet which is broken up and ground to a powder of average particle size of 0.25 to 2 mm (corresponding to U.S. Standard screens Nos. 10 and 60).

The ground frozen product is loaded onto trays in a conventional freeze-drier. The layer thickness of the particles on the trays is about 25 mm and the residence time in the chamber between 7 and 10 hours.

A dry powder is obtained having the appearance of ground roast coffee particles and a density which corresponds to that of a conventional spray-dried coffee extract. This powder is aromatised by plating with 0.5% by weight of an emulsion containing 1 part of condensed volatile coffee aromatics and 2 parts of coffee oil as carrier. Finally, aromatised powder is packed in airtight containers in an inert atmosphere.

A coffee powder (A) prepared by the procedure described in this Example and a conventional spray-dried coffee powder (B) were analysed by gas chromatography which gave the following results:

|  | A | B |
|---|---|---|
| Low-boiling volatile aroma fraction | 3546 | 3025 |
| High-boiling volatile aroma fraction | 193 | 110 |
| Methyl-furan | 183 | 103 |
| N-methyl pyrrole | 63 | 16 |

These values indicate that the product prepared by the process according to the present invention contains more of the volatile aromatic principles of coffee than does a conventional spray-dried coffee extract.

EXAMPLE 2

An aqueous coffee extract is prepared as described in Example 1 except that the percolator bank comprises 8 cells each 138 cm in diameter and 190 cm high. The total quantity of coffee is about 500 kg and the quantity of extract drawn from the sixth cell, containing fresh coffee, is 1450 kg.

The aqueous extract is then concentrated in two stages by freezing, using Gulf crystallisers, for example. After the first stage, the extract is in the form of a pumpable slurry which is centrifuged to provide a concentrated liquor containing about 28% total solids, which is further concentrated to about 36% total in the second stage.

The condensate of volatile aromatics obtained by stripping fresh coffee before extraction with water (about 2% of the coffee) is then added to the extract together with 0.6% by weight (calculated on the coffee solids present in the extract) of coffee oil, obtained by pressing or solvent extraction of roasted coffee beans.

The aromatised coffee extract is then transformed into a foam of density 0.6 to 0.8 gm/cc and frozen as described in Example 1. The frozen product is broken up and ground to a particle size of 0.1 to 0.5 mm. After freeze-drying, the powder is agglomerated in a suitable agglomeration chamber. The agglomerated powder, having a density of 0.23 to 0.25 gm/cc, may be aromatised as described in Example 1 and packed in air-tight containers in an inert atmosphere.

EXAMPLE 3

An aqueous coffee extract prepared as described in Example 1 is concentrated under reduced pressure (about 380 mm) in a "Turbafilm" evaporator. The aromatic vapours given off are passed through a column packed with Raschig rings counter-current to a condensate issuing from a double condenser which is cooled to a temperature such that 95% of the vapours are condensed in the first condenser. After stripping, this condensate is discarded. The condensate collected in the second condenser, representing 5% of the vapours or 4% of the original extract, is added to the concentrated extract before drying. The aromatised extract is transformed into a stable foam which is frozen, ground and freeze-dried as described in Example 1.

What we claim is:

1. Process for preparing freeze dried soluble coffee, which comprises adding sufficient inert gas to a concentrated aqueous extract of roast coffee to provide a foam having a density between 0.6 and 0.8 gm/cc, freezing the foamed extract to a solid mass, grinding the frozen foam to an average particle size of about 0.1 to 0.5 mm, freeze drying the ground particles to provide finely powdered soluble coffee, and agglomerating the finely powdered soluble coffee.

2. Process according to claim 1, in which the agglomerated soluble coffee has a density of about 0.2 to 0.3 gm/cc.

* * * * *

UNITED STATES PATENT AND TRADEMARK OFFICE
CERTIFICATE OF CORRECTION

PATENT NO. : 4,324,808
DATED : April 13, 1982
INVENTOR(S) : John H. Wertheim & Abraham R. Mishkin It is certified that error appears in the above—identified patent and that said Letters Patent is hereby corrected as shown below:

Column 1, line 16, "cevelop" should read --develop--.

Column 3, line 62, "170° and" should read --170° C and--.

Column 4, line 65, "total in the" should read --total solids in the--.

Signed and Sealed this

Twenty-seventh Day of July 1982

[SEAL]

Attest:

GERALD J. MOSSINGHOFF

Attesting Officer    Commissioner of Patents and Trademarks